(12) United States Patent
Yang

(10) Patent No.: US 12,531,952 B2
(45) Date of Patent: Jan. 20, 2026

(54) INFORMATION PROCESSING APPARATUS, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventor: Dawei Yang, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 601 days.

(21) Appl. No.: 17/867,180

(22) Filed: Jul. 18, 2022

(65) Prior Publication Data

US 2023/0308555 A1    Sep. 28, 2023

(30) Foreign Application Priority Data

Mar. 24, 2022   (JP) ................................. 2022-049097

(51) Int. Cl.
*H04N 1/00* (2006.01)
*G06F 3/12* (2006.01)

(52) U.S. Cl.
CPC ....... *H04N 1/00244* (2013.01); *G06F 3/1205* (2013.01); *G06F 3/1225* (2013.01); *H04N 1/00472* (2013.01)

(58) Field of Classification Search
None
See application file for complete search history.

(56) References Cited

U.S. PATENT DOCUMENTS

| | | | | |
|---|---|---|---|---|
| 6,052,198 A | * | 4/2000 | Neuhard | G06F 3/1211 358/1.9 |
| 6,654,746 B1 | * | 11/2003 | Wong | G06F 16/182 709/219 |
| 7,016,944 B1 | * | 3/2006 | Meyer | H04L 67/34 717/172 |
| 8,245,192 B1 | * | 8/2012 | Chen | G06F 8/71 717/122 |

(Continued)

FOREIGN PATENT DOCUMENTS

JP    2014-045311 A    3/2014
JP    2018-185869 A    11/2018

*Primary Examiner* — Helen Zong
(74) *Attorney, Agent, or Firm* — Oliff PLC

(57) ABSTRACT

An information processing apparatus includes a processor configured to: when receiving an instruction for image formation of a printing target file issued to an image forming apparatus, transmit image data generated based on the printing target file and processing information to a server, the processing information including access information regarding access to the information processing apparatus and information for forming an image represented by the image data, and store the image data into the information processing apparatus; when the printing target file is updated, perform at least one of processing for providing a notification of the update in the printing target file and processing for updating the image data transmitted to the server and the image data stored in the information processing apparatus to image data generated based on the updated printing target file; and perform control for transmitting the image data to the image forming apparatus in response to a request from the image forming apparatus for transmission of the image data.

20 Claims, 13 Drawing Sheets

(56) References Cited

U.S. PATENT DOCUMENTS

| | | | |
|---|---|---|---|
| 8,477,348 B2* | 7/2013 | Matsuzawa | H04N 1/00233 |
| | | | 358/1.9 |
| 8,542,370 B2* | 9/2013 | Ikeura | G06F 3/1204 |
| | | | 358/1.15 |
| 9,311,071 B2* | 4/2016 | Tan | G06F 8/656 |
| 9,817,621 B2 | 11/2017 | Ochi et al. | |
| 9,978,162 B1* | 5/2018 | Brett | H04L 41/22 |

* cited by examiner

FIG. 5
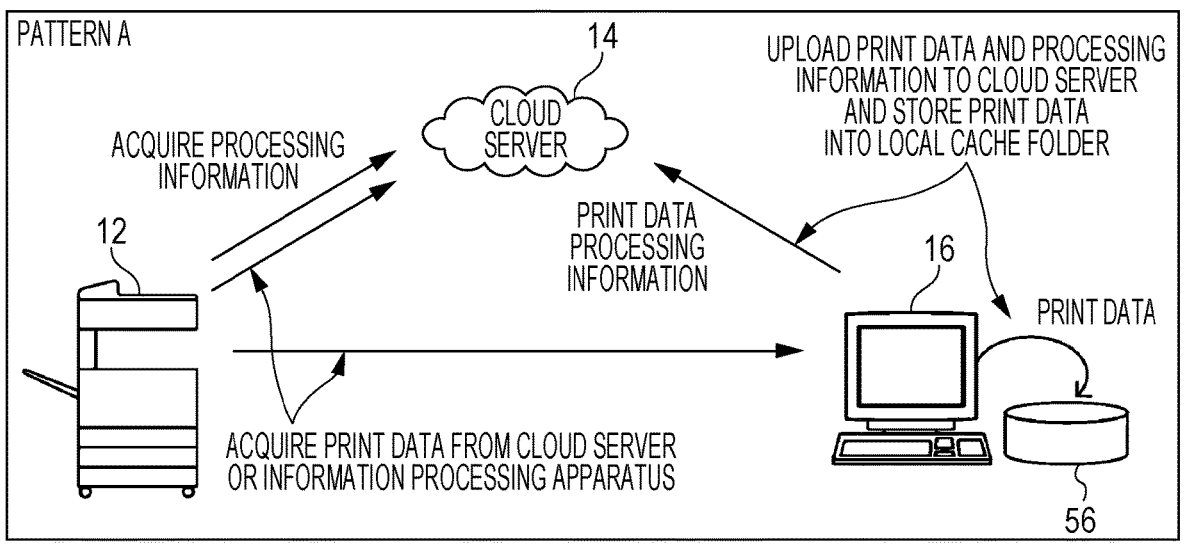
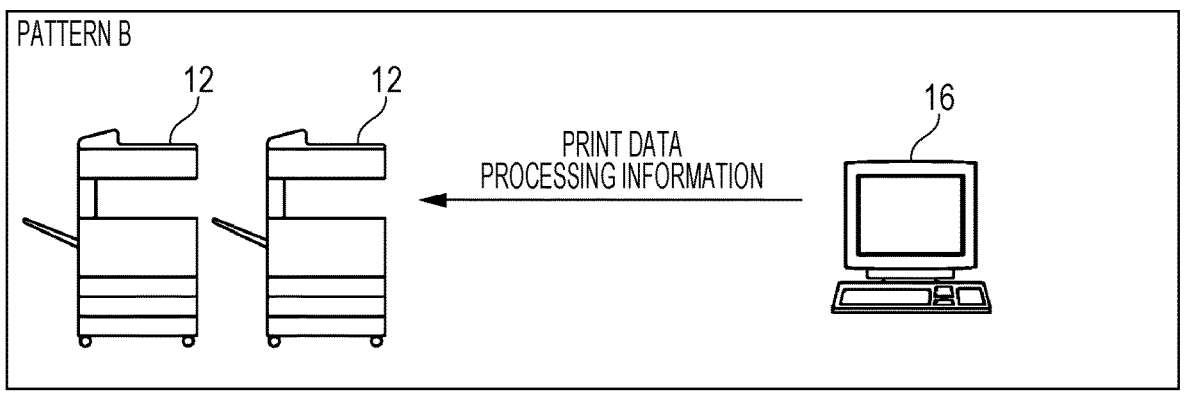

FIG. 8

THE REGISTERED FILE BELOW HAS BEEN UPDATED.
DO YOU WISH TO UPDATE PRINT DATA?

D:\PrintingTarget\Plan.docx        | OPEN FILE |

| DO NOT UPDATE | | UPDATE | | CHECK AND CHANGE PRINTING SETTINGS | | STOP UPDATE CHECKING |

FIG. 9

THE PRINT DATA OF THE REGISTERED FILE BELOW HAS BEEN UPDATED.

D:\PrintingTarget\Plan.docx        | OPEN FILE |

| CHECK AND CHANGE PRINTING SETTINGS |    | STOP UPDATE CHECKING |

FIG. 10

THE REGISTERED FILE BELOW HAS BEEN DELETED OR MOVED.
DO YOU WISH TO DELETE PRINT DATA?

D:\PrintingTarget\Plan.docx

| UPDATE FILE PATH | | DO NOT DELETE | | DELETE |

FIG. 11

| JOB ID | AUTOMATIC UPDATE FLAG | AUTOMATIC UPDATE SETTING ID | AUTOMATIC UPDATE FILE ID | PRINTING SETTING ID | CACHE MANAGEMENT ID | SERVER REGISTRATION ID |
|---|---|---|---|---|---|---|
| 1 | No | NULL | NULL | NULL | 20220121-100 | PC0022-001234 |
| 2 | Yes | A-001 | F-007 | P-011 | 20220121-101 | PC0022-001235 |
| 3 | Yes | A-002 | F-008 | P-012 | 20220121-102 | PC0022-001236 |
| ... | ... | ... | ... | ... | ... | ... |

FIG. 12

| SETTING ID | UPDATE CHECKING INTERVALS SETTING | LAST CHECKING TIME | NEXT CHECKING TIME | UPDATE NECESSITY CONFIRMATION | NOTIFICATION AFTER UPDATE | UPDATE CHECKING TIME | OPERATION AFTER FILE DELETION |
|---|---|---|---|---|---|---|---|
| A-001 | EVERY HOUR | 1/21/2022 14:10 | 1/21/2022 15:10 | POP-UP NOTIFICATION | Yes | 1/21/2022 23:59 | NOTIFY |
| A-002 | NEXT PC START UP | 1/21/2022 8:50 | | AUTOMATIC UPDATE | No | UP TO FILE DELETION | CLEAR CACHE |

FIG. 13

| FILE ID | FILE NAME | STORAGE PATH | FILE SIZE | GENERATION DATE TIME TIME | VERSION | HASH VALUE |
|---|---|---|---|---|---|---|
| F-007 | Plan.xxx | D:\PrintingTarget | 3.5 MB | 1/14/2022 10:30 | K2 | 624829944b92ffa88072ff9d5bb14475bf17e9d6 |
| F-008 | Proposal.zzz | E:\ProjectFile | 5 MB | 1/17/2022 11:50 | K3 | c609e2a844233d23e9013a1e7f53aaedf0f97a57 |

FIG. 14

| PRINTING SETTING ID | DOCUMENT SIZE | DOCUMENT ORIENTATION | OUTPUT PAPER SIZE | COLOR MODE | DOUBLE-SIDED | MULTIPLE PAGES PER SHEET | PRINTING RANGE | RESERVATION NUMBER ISSUING | PIN |
|---|---|---|---|---|---|---|---|---|---|
| P-011 | A3 | LANDSCAPE | A4 | COLOR | SINGLE-SIDED | OFF | ALL PAGES | NO | 999999 |
| P-012 | A4 | PORTRAIT | A4 | MONOCHROME | DOUBLE-SIDED (LONG EDGE) | 2-UP | JANUARY 3 | PR#1145 | NULL |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-049097 filed Mar. 24, 2022.

BACKGROUND

(i) Technical Field

The present disclosure relates to an information processing apparatus, an information processing system, and a non-transitory computer readable medium.

(ii) Related Art

An image forming method is suggested in Japanese Unexamined Patent Application Publication No. 2018-185869. In the image forming method, in a case where, in the process of image formation based on image formation data acquired from an information processing apparatus, the state of an image formation relation unit relating to image formation becomes error and there is image formation data acquired from a server from which image formation is performed after the image formation data acquired from the information processing apparatus, state information regarding the state of the image formation relation unit is notified to the server.

An image forming apparatus is suggested in Japanese Unexamined Patent Application Publication No. 2014-045311. After a user account of a cloud service system is logged in, the image forming apparatus uploads image data in association with an ID to a storage service. Once the upload communication for the image data is completed, the image forming apparatus searches the storage service for the image data using the ID as a key, and verifies that the image data is registered in the storage service. In the case where the image data fails to be registered, the image forming apparatus re-uploads the image data.

SUMMARY

In image formation via a server, a file is downloaded from the server. Therefore, such image formation tends to take a long time compared to image formation via direct connection to an image forming apparatus. However, for example, in the case where direct connection to an image formation apparatus is not able to be established, image formation needs to be performed via a server. It would be troublesome for users to select where to transmit image data, that is, select whether image data is to be stored in the server to form an image or directly transmitted to the image forming apparatus to form an image, every time that image formation needs to be performed.

Aspects of non-limiting embodiments of the present disclosure relate to providing an information processing apparatus, an information processing system, and a non-transitory computer readable medium that are capable of performing image formation without selecting whether image data is to be transmitted to a server or to an image forming apparatus every time that image formation needs to be performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: when receiving an instruction for image formation of a printing target file issued to an image forming apparatus, transmit image data generated based on the printing target file and processing information to a server, the processing information including access information regarding access to the information processing apparatus and information for forming an image represented by the image data, and store the image data into the information processing apparatus; when the printing target file is updated, perform at least one of processing for providing a notification of the update in the printing target file and processing for updating the image data transmitted to the server and the image data stored in the information processing apparatus to image data generated based on the updated printing target file; and perform control for transmitting the image data to the image forming apparatus in response to a request from the image forming apparatus for transmission of the image data.

BRIEF DESCRIPTION OF THE DRAWINGS

Exemplary embodiments of the present disclosure will be described in detail based on the following figures, wherein:

FIG. 5 is a diagram for explaining an example of processing patterns based on which printing is performed by an image forming apparatus in an image forming system according to an exemplary embodiment;

FIG. 8 is a diagram illustrating an example of a pop-up screen for confirmation of update necessity;

FIG. 9 is a diagram illustrating an example of a screen for notification of completion of automatic update;

FIG. 10 is a diagram illustrating an example of a screen for confirmation after detection of file deletion;

FIG. 11 is a diagram illustrating an example of a job information table;

FIG. 12 is a diagram illustrating an example of an automatic update setting information table;

FIG. 13 is a diagram illustrating an example of an automatic update file information table;

FIG. 14 is a diagram illustrating an example of a printing setting information table.

DETAILED DESCRIPTION

Figure 1:
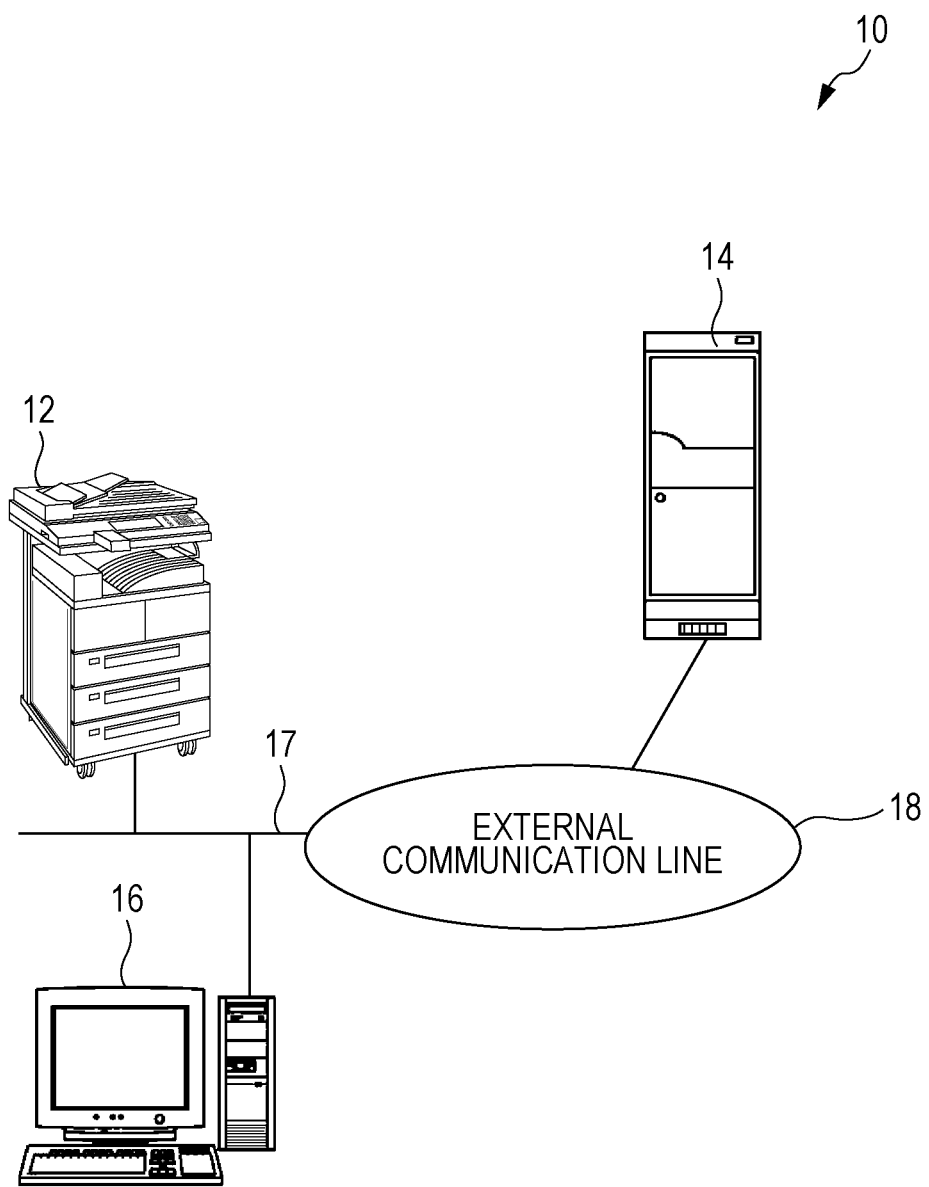
FIG. 1 is a diagram illustrating a schematic configuration of an image forming system according to an exemplary embodiment.

Exemplary embodiments of the present disclosure will be described below with reference to drawings. FIG. 1 is a diagram illustrating a schematic configuration of an image forming system according to an exemplary embodiment. In this exemplary embodiment, an image forming system 10 will be described as an example of an information processing system.

The image forming system 10 according to an exemplary embodiment includes, as illustrated in FIG. 1, an image forming apparatus 12, a cloud server 14 as an example of a server, and an information processing apparatus 16. In this exemplary embodiment, only an image forming apparatus 12, a cloud server 14, and an information processing apparatus 16 are provided. However, a plurality of image forming apparatuses 12, a plurality of cloud servers 14, and a plurality of information processing apparatuses 16 may be provided. Furthermore, the information processing apparatus 16 may be a personal computer or a portable terminal such as a tablet terminal or a smartphone.

The image forming apparatus 12 and the information processing apparatus 16 are connected to an internal communication line 17 such as a local area network (LAN) or an intranet. The internal communication line 17 and the cloud server 14 are connected to an external communication line 18 such as a wide area network (WAN) or the Internet. The image forming apparatus 12, the cloud server 14, and the information processing apparatus 16 are able to perform transmission and reception of various data to and from one another via the internal communication line 17 and the external communication line 18.

Figure 2:
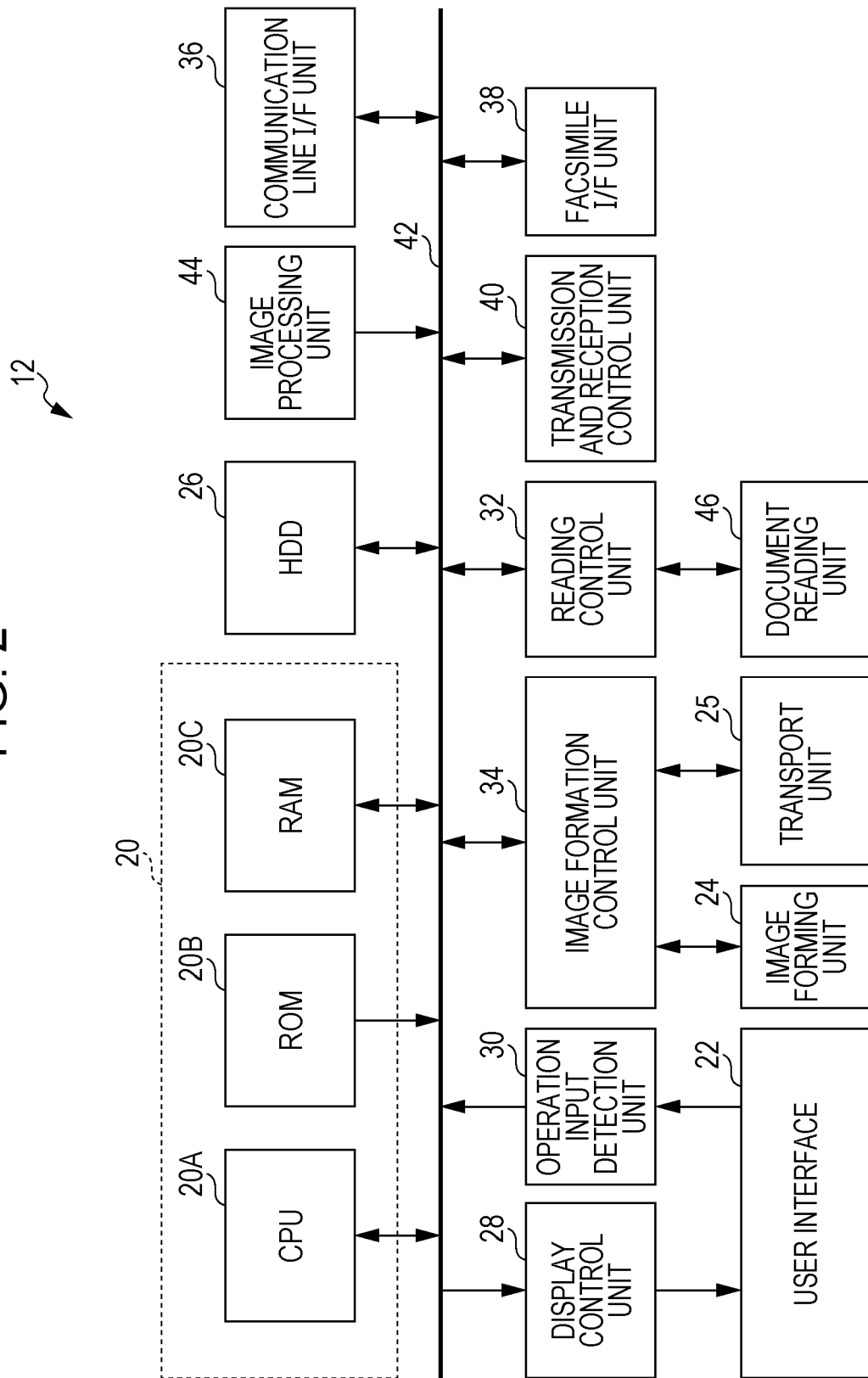
FIG. 2 is a block diagram illustrating a configuration of a principal part of an electrical system of an image forming apparatus according to an exemplary embodiment.

FIG. 2 is a block diagram illustrating a configuration of a principal part of an electrical system of the image forming apparatus 12 according to an exemplary embodiment.

The image forming apparatus 12 according to this exemplary embodiment includes, as illustrated in FIG. 2, a control unit 20 including a central processing unit (CPU) 20A as an example of a second processor, a read only memory (ROM) 20B, and a random access memory (RAM) 20C. The CPU 20A manages the overall operation of the image forming apparatus 12. The RAM 20C is used as a work area or the like when various programs are executed by the CPU 20A. Various control programs, various parameters, and the like are stored in advance in the ROM 20B. In the image forming apparatus 12, components of the control unit 20 are electrically connected to one another by a system bus 42.

In addition, the image forming apparatus 12 according to this exemplary embodiment includes a hard disk drive (HDD) 26 in which various data, application programs, and the like are stored. The image forming apparatus 12 also includes a display control unit 28 that is connected to a user interface 22 and controls display of various operation screens and the like on a display of the user interface 22. The image forming apparatus 12 also includes an operation input detection unit 30 that is connected to the user interface 22 and detects an operation instruction input via the user interface 22. In the image forming apparatus 12, the HDD 26, the display control unit 28, and the operation input detection unit 30 are electrically connected to the system bus 42. An example of the image forming apparatus 12 according to this exemplary embodiment that includes the HDD 26 will be described below. However, the image forming apparatus 12 does not necessarily include the HDD 26 and may include a non-volatile storing unit such as a flash memory.

Furthermore, the image forming apparatus 12 according to this exemplary embodiment includes a reading control unit 32 that controls an optical image reading operation by a document reading unit 46 and a document feeding operation by a document transport unit and an image formation control unit 34 that controls image formation processing by an image forming unit 24 and transport of paper to the image forming unit 24 by a transport unit 25. The image forming apparatus 12 also includes a communication line interface (communication line I/F) unit 36 that is connected to the internal communication line 17 and performs transmission and reception of communication data to and from other external apparatuses such as the cloud server 14 connected to the internal communication line 17 and an image processing unit 44 that performs various types of image processing. The image forming apparatus 12 further includes a facsimile interface (facsimile I/F) unit 38 that is connected to a telephone line, which is not illustrated in drawings, and performs transmission and reception of facsimile data to and from a facsimile apparatus connected to the telephone line. The image forming apparatus 12 also includes a transmission and reception control unit 40 that controls transmission and reception of facsimile data via the facsimile I/F unit 38. In the image forming apparatus 12, the transmission and reception control unit 40, the reading control unit 32, the image formation control unit 34, the communication line I/F unit 36, the facsimile I/F unit 38, and the image processing unit 44 are electrically connected the system bus 42.

With the configuration described above, in the image forming apparatus 12 according to this exemplary embodiment, the CPU 20A accesses the RAM 20C, the ROM 20B, and the HDD 26. Furthermore, in the image forming apparatus 12, the CPU 20A causes the display control unit 28 to control display of an operation screen and information such as various messages on the display of the user interface 22. In the image forming apparatus 12, the CPU 20A causes the reading control unit 32 to control operations of the document reading unit 46 and the document transport unit. In the image forming apparatus 12, the CPU 20A causes the image formation control unit 34 to control operations of the image forming unit 24 and the transport unit 25 and causes the communication line I/F unit 36 to control transmission and reception of communication data. In the image forming apparatus 12, the CPU 20A causes the transmission and reception control unit 40 to control transmission and reception of facsimile data by the facsimile I/F unit 38. Furthermore, in the image forming apparatus 12, the CPU 20A understands content of an operation using the user interface 22 on the basis of operation information detected by the operation input detection unit 30 and performs various types of control based on the content of the operation. Hereinafter, forming an image on paper may be referred to as printing.

Figure 3:
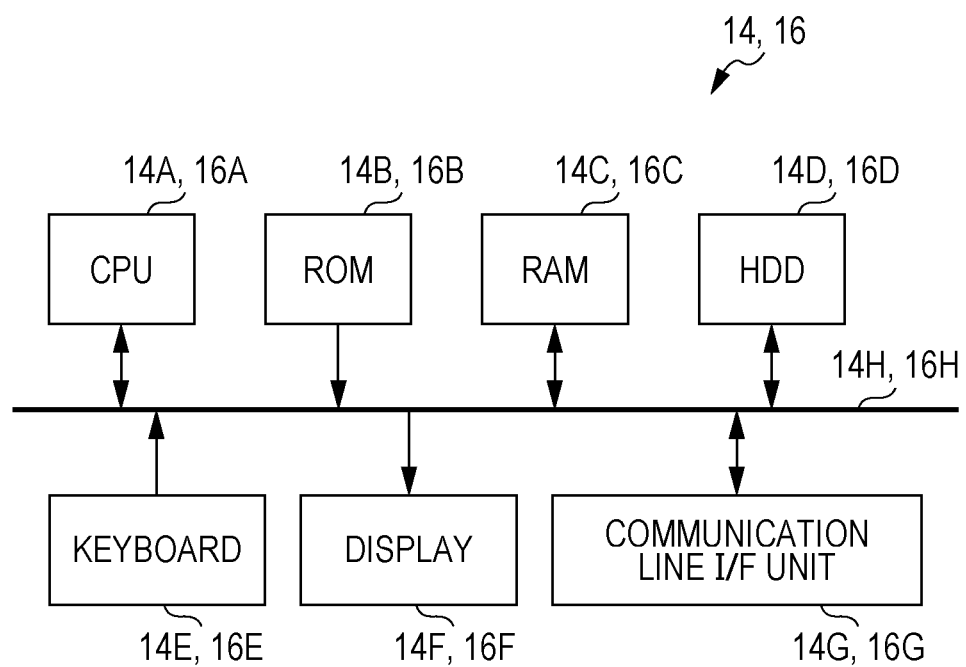
FIG. 3 is a block diagram illustrating a configuration of a principal part of an electrical system of a cloud server and an information processing apparatus according to an exemplary embodiment.

Now, a configuration of a principal part of an electrical system of the cloud server 14 and the information processing apparatus 16 in this exemplary embodiment will be described. FIG. 3 is a block diagram illustrating a configuration of a principal part of an electrical system of the cloud server 14 and the information processing apparatus 16 in this exemplary embodiment. Basically, the cloud server 14 and the information processing apparatus 16 each have a configuration of a typical computer. Thus, a configuration of a principal part of the electrical system of the cloud server 14 will be described as a representative. Explanation for a configuration of a principal part of the electrical system of the information processing apparatus 16 will be omitted, and only corresponding reference signs are indicated in FIG. 3.

The cloud server 14 in this exemplary embodiment includes, as illustrated in FIG. 3, a CPU 14A, a ROM 14B, a RAM 14C, an HDD 14D, a keyboard 14E, a display 14F, and a communication interface (I/F) unit 14G. The CPU 14A manages the overall operation of the cloud server 14. Various control programs, various parameters, and the like are stored in advance in the ROM 14B. The RAM 14C is used as a work area or the like when various programs are executed by the CPU 14A. Various data, application programs, and the like are stored in the HDD 14D. The keyboard 14E is used to input various types of information. The display 14F is used to display various types of information. The communication line I/F unit 14G is connected to the external communication line 18 and performs transmission and reception of various data to and from other apparatuses connected to the external communication line 18. The components of the cloud server 14 described above are electrically connected to one another by a system bus 14H. An example of the cloud server 14 in this exemplary embodiment that includes the HDD 14D will be described below. However, the cloud server 14 does not necessarily include the HDD 14D and may include a non-volatile storing unit such as a flash memory. A communication line interface (I/F) unit 16G of the information processing apparatus 16 is connected to the internal communication line 17 and performs transmission and reception of various data to and from other apparatuses connected to the internal communication line 17.

With the configuration described above, in the cloud server 14 in this exemplary embodiment, the CPU 14A accesses the ROM 14B, the RAM 14C, and the HDD 14D, acquires various data using the keyboard 14E, and displays various types of information on the display 14F. Furthermore, in the cloud server 14, the CPU 14A controls transmission and reception of communication data via the communication line I/F unit 14G. A CPU 16A corresponds to an example of a first processor.

Figure 4:
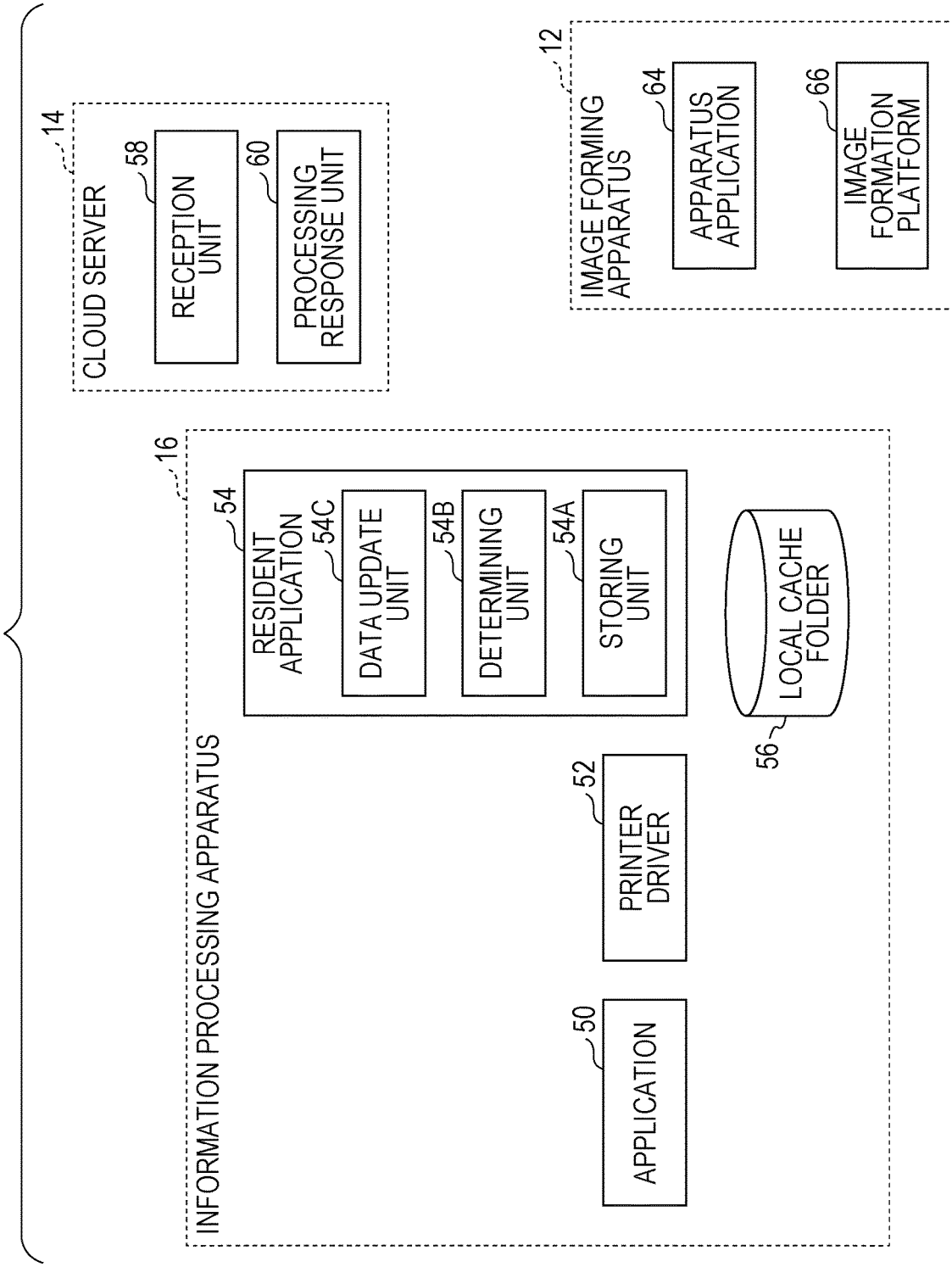
FIG. 4 is a functional block diagram illustrating a functional configuration of units in an image forming system according to an exemplary embodiment.

Next, a functional configuration of units in the image forming system 10 according to this exemplary embodiment configured as described above will be described. FIG. 4 is a functional block diagram illustrating a functional configuration of the units in the image forming system 10 according to this exemplary embodiment.

The information processing apparatus 16 implements functions of an application 50, a printer driver 52, and a resident application 54 when the CPU 16A executes a program.

The application 50 includes various applications having a printing function running on the information processing apparatus 16.

The printer driver 52 performs processing for creating print data as image data in accordance with an instruction from the application 50 and passing the print data to the resident application 54.

The resident application 54 receives print data from the printer driver 52 and responds to a print data acquisition request from an apparatus application 64 of the image forming apparatus 12. The resident application 54 also performs processing for storing print data into a local cache folder 56. The resident application 54 encrypts print data and stores the encrypted print data into the local cache folder 56 so that security of the print data is ensured. However, simplified processing in which non-encrypted print data is stored may be performed. Alternatively, setting as to whether or not to encrypt print data may be performed.

Furthermore, the resident application 54 includes functions of a storing unit 54A, a determining unit 54B, and a data update unit 54C.

The storing unit 54A stores, when receiving an instruction for continuously monitoring a target file at the time when print data is registered in the cloud server 14, various attributes of an original printing target file (for example, the storage path, file name, size, update date and time, a hash value of the content of the original file, and the like). The storing unit 54A also stores print data in the cloud server 14 and print data in the local cache folder 56 in association with each other.

The determining unit 54B performs processing for continuously monitoring a printing target file and determining whether or not there has been an update in the printing target file. For example, the determining unit 54B monitors an attribute of the printing target file and determines whether or not there has been an update in the printing target file on the basis of whether or not there has been a change in the attribute.

The data update unit 54C performs, in a case where a change in a printing target file is detected by the determining unit 54B, processing for updating print data stored in each of the local cache folder 56 and the cloud server 14.

The cloud server 14 implements functions of a reception unit 58 and a processing response unit 60 when the CPU 14A executes a program.

The reception unit 58 receives from the resident application 54 processing information indicating content of processing, such as printing settings, and print data. The processing information includes setting conditions for printing, such as the number of copies to be printed, image quality, and color/monochrome, and a document name. The document name may be the original file name or the title of a webpage. The document name varies depending on the application that performs printing. Furthermore, in this exemplary embodiment, the processing information further includes access information such as an IP address. However, the processing information may be separated from the access information.

The processing response unit 60 responds to various requests such as a processing list acquisition request from the apparatus application 64 of the image forming apparatus 12.

The image forming apparatus 12 implements functions of the apparatus application 64 and an image formation platform 66 when the CPU 20A executes a program.

The apparatus application 64 includes functions for performing processing for displaying a screen for a processing list and the like on the user interface 22 and for passing print data acquired from the cloud server 14 or the resident application 54 to the image formation platform 66.

The image formation platform 66 provides a basic function as the image forming apparatus 12, such as display on the user interface 22 and image formation based on print data. For example, the image formation platform 66 includes an application programming interface (API).

Next, processing patterns based on which printing is performed by the image forming apparatus 12 in the image forming system 10 according to this exemplary embodiment will be described. FIG. 5 is a diagram for explaining examples of processing patterns based on which printing is performed by the image forming apparatus 12 in the image forming system 10 according to this exemplary embodiment.

In the image forming system 10 according to this exemplary embodiment, the image forming apparatus 12 is capable of printing in accordance with two types of processing patterns, that is, pattern A and pattern B.

In this exemplary embodiment, printing is performed in accordance with the pattern A in the case where the information processing apparatus 16 is able to connect to the cloud server 14, and printing is performed in accordance with the pattern B in the case where the information processing apparatus 16 is not able to connect to the cloud server 14.

In the pattern A, the information processing apparatus 16 transmits to the cloud server 14 print data and processing information including access information regarding access to the information processing apparatus 16 and information for forming an image represented by the print data, and stores the print data into the local cache folder 56 of the information processing apparatus 16. In printing at the image forming apparatus 12, the image forming apparatus 12 acquires the processing information from the cloud server 14, and acquires the print data from the cloud server 14 or the information processing apparatus 16 to perform printing. Uploading the processing information and the print data to the cloud server 14 and storing the print data into the information processing apparatus 16 are not necessarily performed at the same time. For example, after uploading the processing information and the print data to the cloud server 14, the print data may be stored into the information processing apparatus 16. In this exemplary embodiment, it is assumed that the processing information and the print data are uploaded to the cloud server 14 from the information processing apparatus 16 in accordance with an operation on the information processing apparatus 16 by a user, and after the print data is stored into the information processing apparatus 16, the user moves to the front of the image forming apparatus 12 and performs an operation on the user interface 22, so that printing is performed.

In the pattern B, the processing information and the print data are directly transmitted from the information processing apparatus 16 to the image forming apparatus 12, and the image forming apparatus 12, to which the processing information and the print data are transmitted, performs printing. Alternatively, printing may be performed using an available image forming apparatus 12 on a network, out of preset image forming apparatuses 12, by using a serverless on-demand print (SODP) service in which printing processing transmitted to an image forming apparatus 12 is allowed to be output from another image forming apparatus 12. Furthermore, in the case where the processing information and the print data are directly transmitted to the image forming apparatus 12 from the information processing apparatus 16 in accordance with the pattern B, short range communication (for example, Wi-Fi® or Bluetooth®) may be used.

At the time of uploading the processing information and the print data to the cloud server 14 from the information processing apparatus 16, the timing when the processing information and the print data in the cloud server 14 will be deleted may be selected. For example, a selection may be made from among confirming deletion of the processing information and the print data at the time of image formation, not deleting the processing information and the print data, and deleting the processing information and the print data after a predetermined time (for example, fifteen minutes) has passed. Furthermore, a time limit by which print data is to be deleted may be selected for each contract unit such as a tenant. For example, a selection may be made in units of contracts, ranging from an hour to seven days.

Furthermore, the print data stored in the information processing apparatus 16 may be deleted at the time different from the time at which the print data transmitted to the cloud server 14 is deleted. This is because the print data in the information processing apparatus 16 is merely a cache and may be deleted at a time earlier than the time at which the print data in the cloud server 14 is deleted. For example, the print data may be deleted by a predetermined operation of the information processing apparatus 16. Specifically, all the print data may be deleted, as a predetermined operation, at the time when the application 50, which manages the print data in the information processing apparatus 16, ends or starts. Accordingly, as a result, all the print data are deleted at the time of logging out, logging in, and restart. Besides them, the print data in the information processing apparatus 16 may be deleted when a predetermined time (for example, five minutes) has passed.

Figure 6:
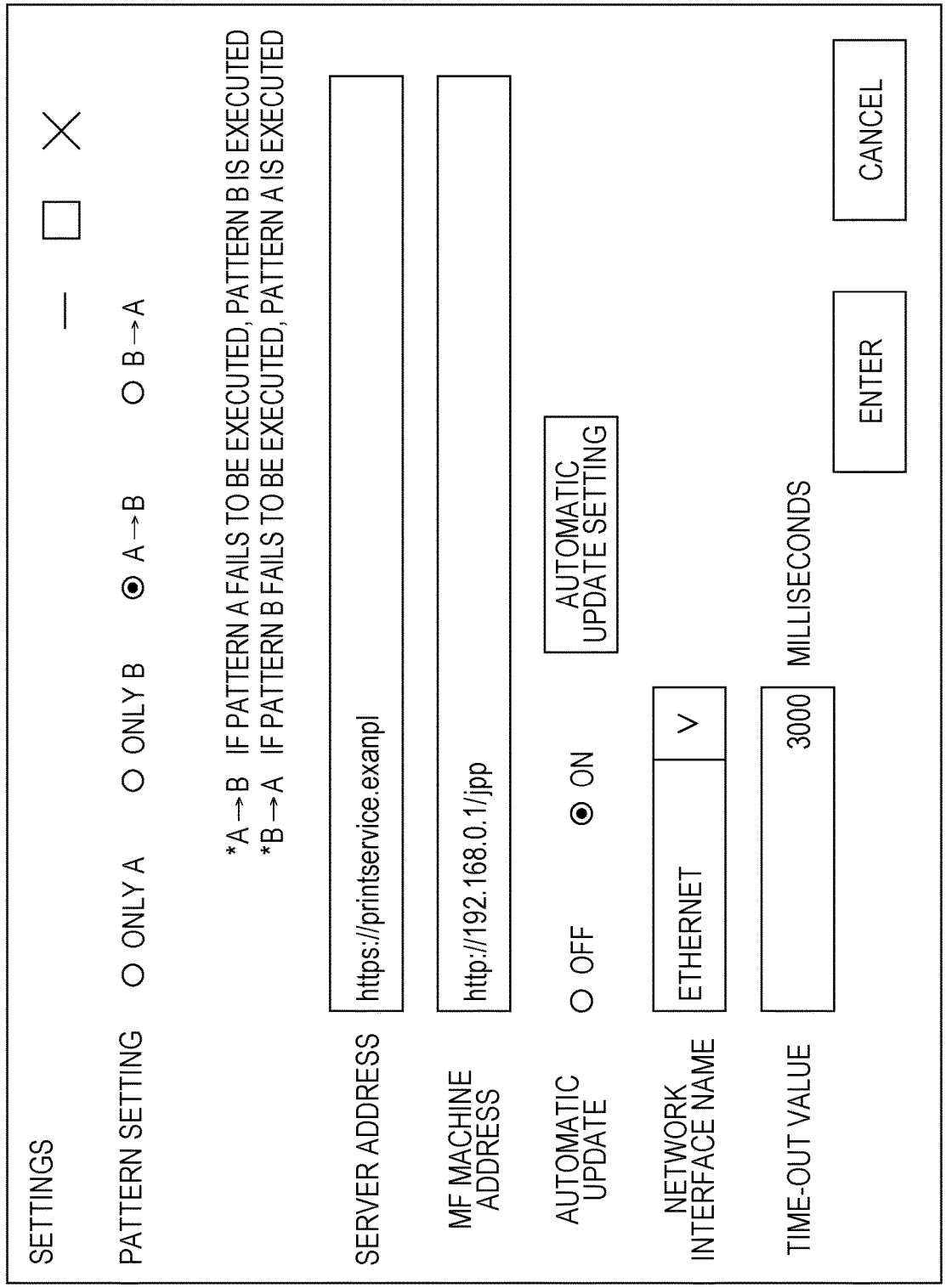
FIG. 6 is a diagram illustrating an example of a setting screen displayed on an information processing apparatus.

Furthermore, in this exemplary embodiment, a processing pattern used when the image forming apparatus 12 performs printing may be set on a setting screen on the information processing apparatus 16. FIG. 6 is a diagram illustrating an example of a setting screen displayed on the information processing apparatus 16.

In the example of FIG. 6, as pattern setting, selection may be made from among four types: only pattern A ("only A" in FIG. 6); only pattern B ("only B" in FIG. 6); pattern B if pattern A fails ("A→B" in FIG. 6); and pattern A if pattern B fails ("B→A" in FIG. 6). In FIG. 6, an example in which "A→B" is selected is illustrated.

Furthermore, on the setting screen illustrated in FIG. 6, the address of the cloud server 14 (server address in FIG. 6), the address of the image forming apparatus 12 (MF machine address in FIG. 6), and a network interface name may be set.

Furthermore, a time-out value for determining whether a processing pattern has failed may be set. When a time set as the time-out value has passed, it is determined that printing has failed.

The server address, the MF machine address, the network interface name, and the time-out value in FIG. 6 may be displayed in the case where an administrator performs an operation and may be non-displayed normally.

In the image forming system 10 according to this exemplary embodiment, in the case where printing is performed in accordance with the pattern A described above, while print data is stored in each of the cloud server 14 and the local cache folder 56 of the information processing apparatus 16, a change in the print data before printing is not reflected in the print data stored in each of the cloud server 14 and the local cache folder 56. That is, after a registered printing target file is updated, if a user forgets to register print data of the file of the new version, the print data of the file of the old version may be printed. In particular, in the case where printing of the same printing target file is requested from multiple users, users other than the user who updated the file may print the file of the old version.

Furthermore, the time and effort of registering the updated file as print data again is required. In particular, every time that a file which requires frequent updates is updated, new print data needs to be registered into the cloud server 14 and the local cache folder 56. This imposes a high burden on users.

In this exemplary embodiment, monitoring as to whether or not there has been a change in a printing target file as the original file of registered print data is performed, and detection as to whether or not there has been an update in the printing target file is performed. When the printing target file is updated, at least one of processing for providing a notification of the update in the printing target file and processing for updating print data transmitted to the cloud server 14 and print data stored in the local cache folder 56 of the information processing apparatus 16 to new print data generated based on the updated printing target file is performed.

In this exemplary embodiment, the information processing apparatus 16 includes a function for confirming whether or not a printing target file needs to be monitored continuously, a function for monitoring the state of a print file, a function for determining whether an update in a file is detected, a function for automatically updating print data of an updated file, and a function for managing a monitoring target file.

With the function for confirming whether or not a printing target file needs to be monitored continuously, monitoring as to whether or not there has been an update in a file is performed on the basis of setting as to whether or not monitoring needs to be continuously performed on the setting screen illustrated in FIG. 6. Specifically, setting is performed by selecting "ON" or "OFF" for "automatic update" in FIG. 6. In the case where "ON" is selected and "automatic update setting" is operated, a setting screen for automatic update illustrated in FIG. 7 is displayed, so that a user is able to perform detailed settings.

On the setting screen for automatic update, settings, such as "update checking intervals", "update necessity confirmation", "notification after update", "update checking time", and "operation after file deletion" as an operation to be performed after image data is deleted, are performed.

Figure 7:
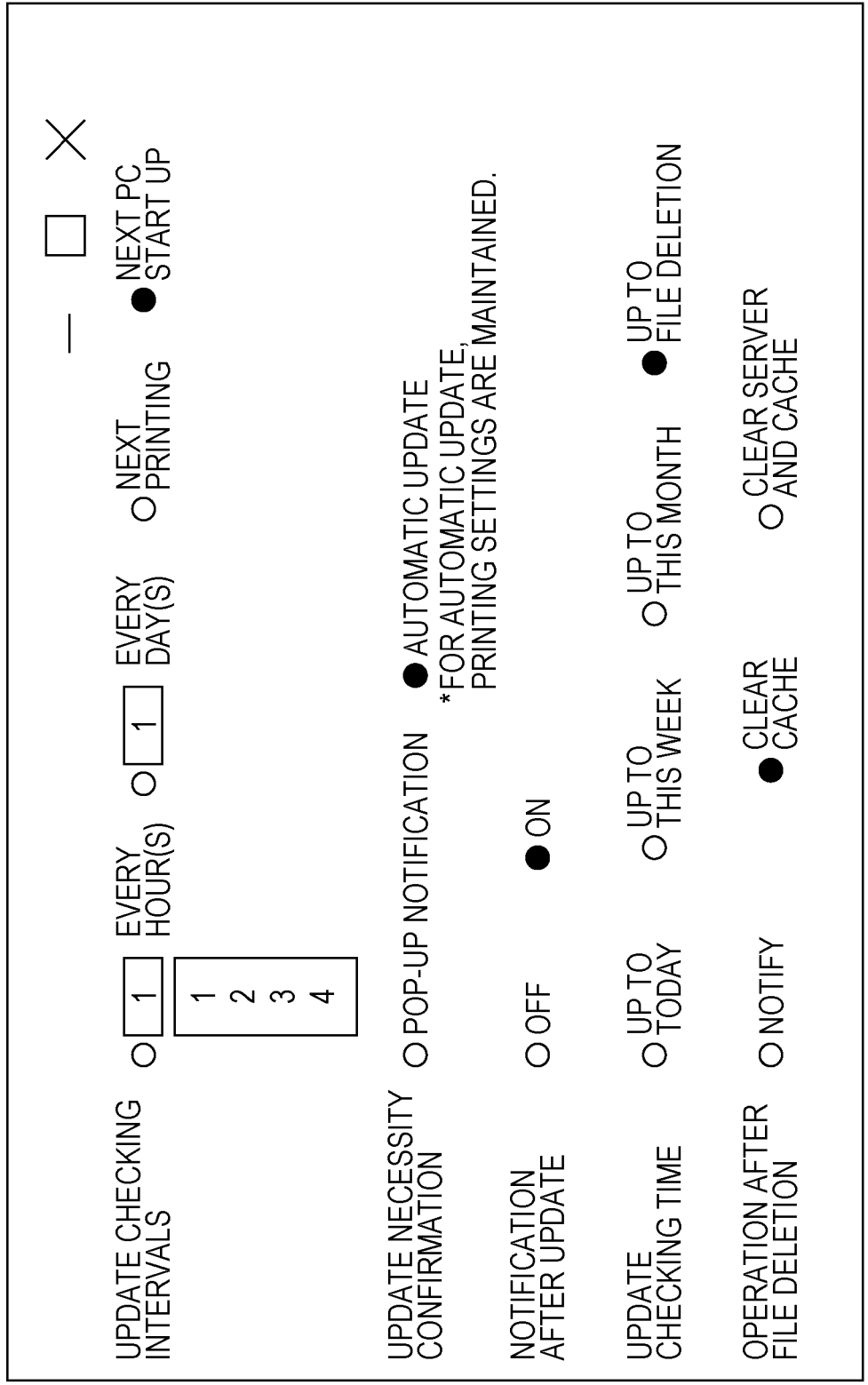
FIG. 7 is a diagram illustrating an example of a setting screen for automatic update.

In the example of the setting screen for automatic update illustrated in FIG. 7, selection for "update checking intervals" may be made from among "every hour(s)", "every day(s)", "next printing", and "next PC start up". In the example illustrated in FIG. 7, "next PC start up" is selected. In FIG. 7, if "every hour(s)" is selected, selection for predetermined time intervals may be made from among one hour, two hours, three hours, and four hours.

Furthermore, selection for "update necessity confirmation" may be made between "pop-up notification" and "automatic update". In the example illustrated in FIG. 7, "automatic update" is selected. In the case where "pop-up notification" is selected, when a printing target file is updated, for example, a pop-up screen for confirmation of update necessity illustrated in FIG. 8 is displayed, and an instruction regarding whether or not update needs to be performed is given on the pop-up screen for confirmation of update necessity. In the example illustrated in FIG. 8, a message "The registered file below has been updated. Do you wish to update print data?" is displayed, and selection may be made from among "open file", "do not update", "update", "check and change printing settings", "stop update checking", and the like.

Furthermore, selection for "notification after update" may be made between "ON" and "OFF". In the example illustrated in FIG. 7, "ON" is selected. In the case where "automatic update" is selected for "update necessity confirmation" and "ON" is selected for "notification after update", a screen for notification of completion of automatic update illustrated in FIG. 9 is displayed at the time when the notification is provided, so that selection may be made from among "open file", "check and change printing settings", "stop update checking", and the like.

Furthermore, selection for "update checking time" may be made from among "up to today", "up to this week", "up to this month", and "up to file deletion". In the example illustrated in FIG. 7, "up to file deletion" is selected.

Furthermore, selection for "operation after file deletion" may be made from among "notify", "clear cache", and "clear server and cache". In the example illustrated in FIG. 7, "clear cache" is selected. In the case where "notify" is selected, a screen for confirmation after detection of file deletion illustrated in FIG. 10 is displayed at the time when the notification is provided. In the example illustrated in FIG. 10, a message "The registered file below has been deleted or moved. Do you wish to delete print data?" is displayed, and selection may be made from among "update file path", "do not delete", "delete", and the like.

Next, an information table managed by the resident application 54 will be described. FIGS. 11 to 14 are diagrams each illustrating an example of an information table managed by the resident application 54. FIG. 11 is a diagram illustrating an example of a job information table. FIG. 12 is a diagram illustrating an example of an automatic update setting information table. FIG. 13 is a diagram illustrating an example of an automatic update file information table. FIG. 14 is a diagram illustrating an example of a printing setting information table. A job represents a process or a group of processes to be executed by the image forming apparatus 12 so that a predetermined function is implemented.

The job information table is a table for managing the list of jobs issued to the image forming apparatus 12. Specifically, as illustrated in FIG. 11, a job ID for identifying each job is provided to the job, and an automatic update flag, an automatic update setting ID, an automatic update file ID, a printing setting ID, a cache management ID, a server registration ID, and the like are managed for each job ID.

The automatic update flag represents a result of selection as to whether "automatic update" is turned "ON" or "OFF" on the setting screen illustrated in FIG. 6. In the case where turning off automatic update is selected, "No" is displayed. In the case where turning on automatic update is selected, "Yes" is displayed. In the example illustrated in FIG. 11, "No" is displayed for job ID 1, "Yes" is displayed for job ID 2, and "Yes" is displayed for job ID 3.

The automatic update setting ID is provided for identifying automatic update setting. An automatic update setting ID is provided in the case where automatic update is set, and setting details of automatic update are managed in an automatic update setting information table described later (see FIG. 12). In the example illustrated in FIG. 11, "NULL" representing absence of an automatic update setting ID is displayed for the job ID 1, for which automatic update is not set, "A-001" is provided as the automatic update setting ID for the job ID 2, for which automatic update is set, and "A-002" is provided as the automatic update setting ID for the job ID 3, for which automatic update is set.

The automatic update file ID is provided for identifying information about a monitoring target file. An automatic update file ID is provided in the case where automatic update is set. Detailed information about a monitoring target file is managed in an automatic update file information table described later (see FIG. 13). In the example illustrated in FIG. 11, "NULL" representing absence of an automatic update file ID is displayed for the job ID 1, for which automatic update is not set, "F-007" is provided as the automatic update file ID for the job ID 2, for which automatic update is set, and "F-008" is provided as the automatic update file ID for the job ID 3, for which automatic update is set.

The printing setting ID is provided for identifying printing setting. A printing setting ID is provided in the case where automatic update is set. Detailed information about printing settings for a monitoring target file is managed in a printing setting information table described later (see FIG. 14). In the example illustrated in FIG. 11, "NULL" representing absence of a printing setting ID is displayed for the job ID 1, for which automatic update is not set, "P-011" is provide as the printing setting ID for the job ID 2, for which automatic update is set, and "P-012" is provided as the printing setting ID for the job ID 3, for which automatic setting is set.

The cache management ID is provided for identifying print data stored in the local cache folder 56. In the example illustrated in FIG. 11, "20220121-100" is provided for the job ID 1, "20220121-101" is provided for the job ID 2, and "20220121-102" is provided for the job ID 3.

The server registration ID is provided for identifying print data stored in the cloud server 14. In the example illustrated in FIG. 11, "PC0022-001234" is provided for the job ID 1, "PC0022-001235" is provided for the job ID 2, and "PC0022-001236" is provided for the job ID 3.

Next, the automatic update setting information table described above will be described with reference to FIG. 12.

The automatic update setting information table is provided for managing "update checking intervals setting", "last checking time", "next checking time", "update necessity confirmation", "notification after update", "update checking time", "operation after file deletion", and the like for each setting ID.

In the "update checking intervals setting" column, the "automatic checking intervals" set on the setting screen for automatic update illustrated in FIG. 7 is managed. In the example illustrated in FIG. 12, "every hour" is set for the setting ID "A-001", and "next PC start up" is set for the setting ID "A-002".

The "last checking time" represents the time when the last checking of a monitoring target file was performed. In the example illustrated in FIG. 12, checking was made on "1/21/2022 14:10" for the setting ID "A-001", and checking was made on "1/21/2022 8:50" for the setting ID "A-002".

The "next checking time" represents the time at which the next checking of a monitoring target file will be performed. In the example illustrated in FIG. 12, checking will be made on "1/21/2022 15:10" for the setting ID "A-001", and the field is left blank for the setting ID "A-002" because "next PC start up" is set as the next checking time.

In the "update necessity confirmation" column, the "update necessity confirmation" set on the setting screen for automatic update illustrated in FIG. 7 is managed. In the example illustrated in FIG. 12, "pop-up notification" is set for the setting ID "A-001", and "automatic update" is set for the setting ID "A-002".

In the "notification after update" column, the "notification after update" set on the setting screen for automatic update illustrated in FIG. 7 is managed. In the example illustrated in FIG. 12, "Yes" is set for the setting ID "A-001", and "No" is set for the setting ID "A-002".

In the "update checking time" column, the "update checking time" set on the setting screen for automatic update illustrated in FIG. 7 is managed. In the example illustrated in FIG. 12, "1/21/2022 23:59" is set as the update checking time for the setting ID "A-001", and "up to file deletion" is set as the update checking time for the setting ID "A-002".

In the "operation after file deletion" column, the "operation after file deletion" set on the setting screen for automatic update illustrated in FIG. 7 is managed. In the example illustrated in FIG. 12, "notify" is set for the setting ID "A-001", and "clear cache" is set for the setting ID "A-002".

Next, the automatic update file information table described above will be described with reference to FIG. 13.

The automatic update file information table is provided for managing the file name, storage path, file size, generation date and time, version, hash value, and the like of each file ID.

The file name represents the name of a monitoring target file. In the example illustrated in FIG. 13, the file with the file ID "F-007" has the file name "Plan.xxx", and the file with the file ID "F-008" has the file name "Proposal.zzz".

The storage path represents the location at which a monitoring target file is stored. In the example illustrated in FIG. 13, the storage path for the file ID "F-007" is "D:\PrintingTarget", and the storage path for the file ID "F-008" is "E:\ProjectFile".

The file size represents the size of a monitoring target file. In the example illustrated in FIG. 13, the file size for the file ID "F-007" is "3.5 MB", and the file size for the file ID "F-008" is "5 MB".

The generation date and time represents the date and time on which a monitoring target file was generated. In the example illustrated in FIG. 13, the generation date and time for the file ID "F-007" is "1/14/2022 10:30", and the generation date and time for the file ID "F-008" is "1/17/2022 11:50".

The version represents the version of a monitoring target file. In the example illustrated in FIG. 13, the version for the file ID "F-007" is "K2", and the version for the file ID "F-008" is "K3".

The hash value represents the hash value of a monitoring target file. In the example illustrated in FIG. 13, the hash value for the file ID "F-007" is "624829944b92ffa88072ff9d5bb14475bf17e9d6", and the hash value for the file ID "F-008" is "c609e2a844233d23e9013a1e7f53aaedf0f97a57".

Next, the printing setting information table described above will be described with reference to FIG. 14.

The printing setting information table is provided for managing the document size, document orientation, output paper size, color mode, double-sided, multiple pages per sheet, printing range, reservation number issuing, PIN, and the like for each printing setting ID.

The document size represents a document size set in printing settings for a monitoring target file. In the example illustrated in FIG. 14, "A3" is set for the printing setting ID "P-011", and "A4" is set for the printing setting ID "P-012".

The document orientation represents the orientation of a document set in printing settings for a monitoring target file. In the example illustrated in FIG. 14, "landscape" is set for the printing setting ID "P-011", and "portrait" is set for the printing setting ID "P-012".

The output paper size represents the size of output paper set in printing settings for a monitoring target file. In the example illustrated in FIG. 14, "A4" is set for the printing setting ID "P-011", and "A4" is set for the printing setting ID "P-012".

The color mode represents a color mode set in printing settings for a monitoring target file. In the example illustrated in FIG. 14, "color" is set for the printing setting ID "P-011", and "monochrome" is set for the printing setting ID "P-012".

The double-sided represents double-sided setting set in printing settings for a monitoring target file. In the example illustrated in FIG. 14, "single-sided" is set for the printing setting ID "P-011", and "double-sided (long edge)" is set for the printing setting ID "P-012".

The multiple pages per sheet represents multiple-pages-per-sheet setting set in printing settings for a monitoring target file. In the example illustrated in FIG. 14, "OFF" is set for the printing setting ID "P-011", and "2-UP" is set for the printing setting ID "P-012".

The printing range represents a printing range set in printing settings for a monitoring target file. In the example illustrated in FIG. 14, "All pages" is set for the printing setting ID "P-011", and "January 3" is set for the printing setting ID "P-012".

The reservation number issuing represents setting for reservation number issuing set in printing settings for a monitoring target file. In the example illustrated in FIG. 14, "NO" is set for the printing setting ID "P-011", and "PR #1145" is set for the printing setting ID "P-012".

The PIN represents setting for a personal identification number set in printing settings for a monitoring target file. In the example illustrated in FIG. 14, "999999" is set for the printing setting ID "P-011", and "NULL", which represents absence of a personal identification number, is set for the printing setting ID "P-012".

Figure 15:
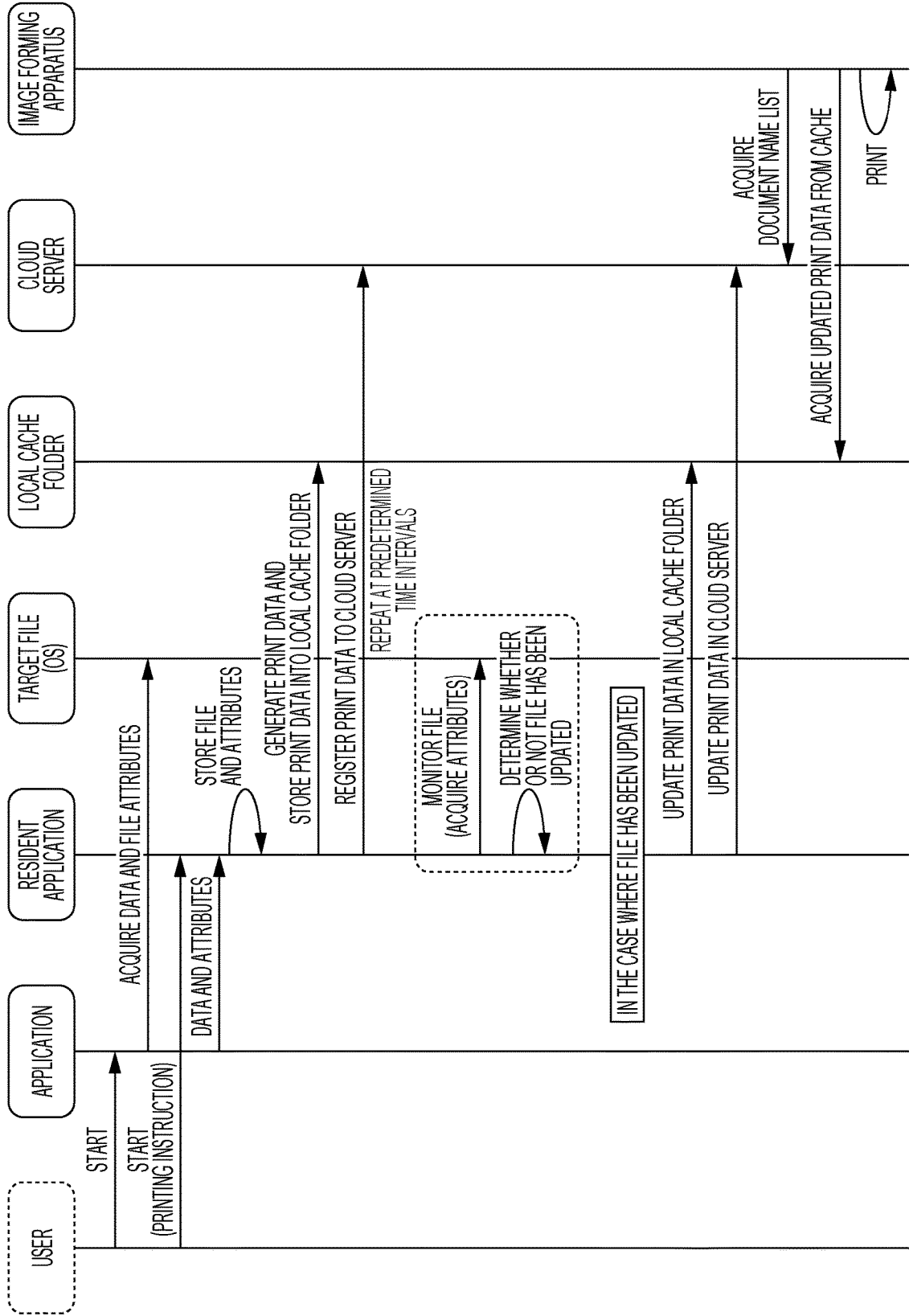
FIG. 15 is a sequence diagram illustrating an example of the procedure of a process performed in an image forming system according to an exemplary embodiment.

Next, the procedure of a specific process performed in the image forming system 10 according to this exemplary embodiment configured as described above will be described with reference to FIG. 15. FIG. 15 is a sequence diagram illustrating an example of the procedure of a process performed in the image forming system 10 according to this exemplary embodiment. In the description below, it is assumed that a printing target file is present in the information processing apparatus 16.

A user starts the application 50, and the application 50 issues a printing instruction. For example, the application 50 issues a printing instruction to the resident application 54 by acquiring and displaying data and file attributes of target files and allowing the user to select a printing target file. Furthermore, the application 50 transmits the data and the attributes to the resident application 54.

The resident application 54 generates print data and stores the file and the attributes into the local cache folder 56. Furthermore, the resident application 54 registers the print data to the cloud server 14. More particularly, the resident application 54 transmits to the cloud server 14 the print data and processing information including access information regarding access to the information processing apparatus 16 and information for forming an image represented by the print data. At the time of registration of the print data, the resident application 54 checks with a person who registered the print data about whether or not the monitoring target file needs to be continuously monitored.

After receiving a continuous monitoring instruction, the resident application 54 stores various attributes of the original printing target file (for example, the storage path, file name, size, update date and time, and hash value of the content of the original file, and the like) into the storing unit 54A. Furthermore, at the time of registration of the target file to the cloud server 14, the data in the cloud server 14 and the print data in the local cache folder 56 are associated with each other.

The resident application 54 checks wither or not there has been an update in the monitoring target file at preset time intervals. Alternatively, at the next start up of the information processing apparatus 16, the resident application 54 checks whether or not there has been an update in the monitoring target file. Then, the determining unit 54B of the resident application 54 determines whether or not there has been an update in the monitoring target file. In the case where the monitoring target file is being edited, update is prohibited. In this case, update checking or automatic update is not performed.

In the case where the resident application 54 detects an update in the monitoring target file, the data update unit 54C provides a notification to the user by pop-up notification or the like in accordance with setting without using an application of a document, and checks whether or not the print data in each of the local cache folder 56 and the cloud server 14 needs to be updated. In the case where the setting is such that no notification is required, the print data in each of the local cache folder 56 and the cloud server 14 is automatically updated to correspond to the updated file.

Thus, when the user operates the user interface 22 of the image forming apparatus 12 to select the changed file from the list of document names and issue a printing instruction, printing of the target file of the latest version is performed.

In the foregoing exemplary embodiment, an example in which a printing target file is present in the information processing apparatus 16 has been described. However, the printing target file is not necessarily present in the information processing apparatus 16. For example, a printing target file may be present in the cloud server 14 or other servers providing other services. In this case, to check whether or not there has been an update in the file, the resident application 54 acquires attributes of the file from the cloud server 14 or other servers in which the file is present and checks whether or not there has been an update in the file.

In the foregoing exemplary embodiment, the image forming apparatus 12 and the information processing apparatus 16 are connected to the cloud server 14 through the internal communication line 17 and the external communication line 18. However, the image forming apparatus 12, the information processing apparatus 16, and the cloud server 14 are not necessarily connected as described above. For example, the image forming apparatus 12, the information processing apparatus 16, and the cloud server 14 may be connected through a single communication line or may be connected through three or more communication lines.

Furthermore, processes performed by units in the image forming system 10 according to the foregoing exemplary embodiment may be performed by software, hardware, or a combination of software and hardware. Furthermore, processes performed by units in the image forming system 10 may be stored as programs in a storing medium and distributed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
when receiving an instruction for image formation of a printing target file issued to an image forming apparatus, generate print data and processing information, the print data being generated based on the printing target file;
transmit the print data generated based on the printing target file and processing information to a server, the processing information including access information regarding access to the information processing apparatus and information for forming an image represented by the print data; and
store the print data into the information processing apparatus;
when the printing target file is updated, perform processing for updating both of the print data transmitted to the server and the print data stored in the information processing apparatus to print data generated based on the updated printing target file; and
perform control for transmitting the print data to the image forming apparatus in response to a request from the image forming apparatus for transmission of the print data.

2. The information processing apparatus according to claim 1, wherein the processor is configured to detect whether or not there has been an update in the printing target file at predetermined time intervals or at start up of the information processing apparatus.

3. The information processing apparatus according to claim 1, wherein the processor is configured to detect an update in the print data by storing an attribute of the printing target file and monitoring an attribute of the print data.

4. The information processing apparatus according to claim 2, wherein the processor is configured to detect an update in the print data by storing an attribute of the printing target file and monitoring an attribute of the print data.

5. The information processing apparatus according to claim 1, wherein the processor is configured to:
perform processing for providing a notification of the update in the printing target file, and
receive an instruction regarding whether or not the print data transmitted to the server and the print data stored in the information processing apparatus need to be updated.

6. The information processing apparatus according to claim 2, wherein the processor is configured to:
perform processing for providing a notification of the update in the printing target file, and
receive an instruction regarding whether or not the print data transmitted to the server and the print data stored in the information processing apparatus need to be updated.

7. The information processing apparatus according to claim 3, wherein the processor is configured to:
perform processing for providing a notification of the update in the printing target file, and
receive an instruction regarding whether or not the print data transmitted to the server and the print data stored in the information processing apparatus need to be updated.

8. The information processing apparatus according to claim 4, wherein the processor is configured to:
perform processing for providing a notification of the update in the printing target file, and
receive an instruction regarding whether or not the print data transmitted to the server and the print data stored in the information processing apparatus need to be updated.

9. The information processing apparatus according to claim 1, wherein the processor is configured to perform processing for receiving setting regarding whether or not checking about an update in the printing target file needs to be performed.

10. The information processing apparatus according to claim 2, wherein the processor is configured to perform processing for receiving setting regarding whether or not checking about an update in the printing target file needs to be performed.

11. The information processing apparatus according to claim 3, wherein the processor is configured to perform processing for receiving setting regarding whether or not checking about an update in the printing target file needs to be performed.

12. The information processing apparatus according to claim 4, wherein the processor is configured to perform processing for receiving setting regarding whether or not checking about an update in the printing target file needs to be performed.

13. The information processing apparatus according to claim 5, wherein the processor is configured to perform processing for receiving setting regarding whether or not checking about an update in the printing target file needs to be performed.

14. The information processing apparatus according to claim 9, wherein the processor is configured to, in a case where setting is such that checking about an update in the printing target file needs to be performed, receive settings regarding update checking intervals, update necessity confirmation, providing or non-providing of a notification after update, an update checking time, and an operation to be performed after deletion of the printing target file.

15. The information processing apparatus according to claim 14, wherein the processor is configured to, in a case where pop-up notification is set as the update necessity confirmation, display a predetermined pop-up screen for confirmation of update necessity and receive an instruction regarding whether or not the printing target file needs to be updated.

16. The information processing apparatus according to claim 14, wherein the processor is configured to, in a case where automatic update is set as the update necessity confirmation and providing a notification is set as the providing or non-providing of a notification after update, when the update to the print data generated based on the updated printing target file is performed, display a predetermined screen for notification of completion of automatic update.

17. The information processing apparatus according to claim 16, wherein the processor is configured to receive setting regarding check and change printing settings on the predetermined screen for notification of completion of automatic update.

18. The information processing apparatus according to claim 1, wherein the processor is configured to, in a case where the printing target file is being edited, checking about an update in the printing target file and update to the print data generated based on the updated printing target file are prohibited.

19. An information processing system comprising:
an information processing apparatus;
an image forming apparatus; and
a server that is able to connect to the information processing apparatus and the image forming apparatus,
wherein the information processing apparatus includes a first processor configured to:
when receiving an instruction for image formation of a printing target file issued to the image forming apparatus, generate print data and processing information, the print data being generated based on the printing target file;
transmit the print data generated based on the printing target file and processing information to the server, the processing information including access information regarding access to the information processing apparatus and information for forming an image represented by the print data, and
store the print data into the information processing apparatus;
when the printing target file is updated, perform processing for updating both of the print data transmitted to the server and the print data stored in the information processing apparatus to print data generated based on the updated printing target file; and
perform control for transmitting the print data to the image forming apparatus in response to a request from the image forming apparatus for transmission of the print data,
wherein the image forming apparatus includes a second processor configured to:
acquire the processing information from the server;
acquire the print data by selecting between acquisition of the print data from the server and acquisition of the print data from the information processing apparatus corresponding to the access information; and
perform control such that image formation is performed using the acquired print data and the acquired processing information.

20. A non-transitory computer readable medium storing a program causing a computer to execute a process for information processing, the process comprising:
when receiving an instruction for image formation of a printing target file issued to an image forming apparatus, generating print data and processing information, the print data being generated based on the printing target file;
transmitting print data generated based on the printing target file and processing information to a server, the processing information including access information regarding access to an information processing apparatus and information for forming an image represented by the print data, and
storing the print data into the information processing apparatus;
when the printing target file is updated, performing processing for updating both of the print data transmitted to the server and the print data stored in the information processing apparatus to print data generated based on the updated printing target file; and
performing control for transmitting the print data to the image forming apparatus in response to a request from the image forming apparatus for transmission of the print data.

* * * * *